(12) United States Patent
Takeda et al.

(10) Patent No.: US 10,467,258 B2
(45) Date of Patent: Nov. 5, 2019

(54) DATA CATEGORIZING SYSTEM, METHOD, PROGRAM SOFTWARE AND RECORDING MEDIUM THEREIN

(71) Applicant: FRONTEO, INC., Tokyo (JP)

(72) Inventors: Hideki Takeda, Tokyo (JP); Kazumi Hasuko, Tokyo (JP)

(73) Assignee: FRONTEO, INC., Tokyo (JP)

( * ) Notice: Subject to any disclaimer, the term of this patent is extended or adjusted under 35 U.S.C. 154(b) by 406 days.

(21) Appl. No.: 15/296,803

(22) Filed: Oct. 18, 2016

(65) Prior Publication Data

US 2017/0124179 A1    May 4, 2017

(30) Foreign Application Priority Data

Oct. 30, 2015 (JP) ................................. 2015-214407

(51) Int. Cl.
*G06F 16/28* (2019.01)

(52) U.S. Cl.
CPC .................................. *G06F 16/285* (2019.01)

(58) Field of Classification Search
CPC .................................................. G06F 16/285
USPC ........................................................ 707/740
See application file for complete search history.

(56) References Cited

U.S. PATENT DOCUMENTS

| | | | |
|---|---|---|---|
| 7,748,036 B2 * | 6/2010 | Speirs, III | H04L 9/06 380/28 |
| 9,101,961 B2 | 8/2015 | Nishiwaki | |
| 2003/0182101 A1 * | 9/2003 | Lambert | G06F 17/2725 704/1 |
| 2004/0093331 A1 * | 5/2004 | Garner | G06N 5/022 |
| 2004/0111453 A1 * | 6/2004 | Harris | G06K 9/6269 708/200 |
| 2005/0216459 A1 * | 9/2005 | Vailaya | G06F 19/12 |
| 2010/0267052 A1 * | 10/2010 | Gelber | C12Q 1/6883 435/7.1 |
| 2011/0289608 A1 * | 11/2011 | Schnell | A61K 31/713 800/9 |
| 2012/0136007 A1 * | 5/2012 | Mootha | A61K 31/382 514/255.04 |

(Continued)

FOREIGN PATENT DOCUMENTS

| | | |
|---|---|---|
| JP | 2004240488 A | 8/2004 |
| JP | 2012-249933 A | 12/2012 |

(Continued)

*Primary Examiner* — Dung K Chau
(74) *Attorney, Agent, or Firm* — Baker & Hostetler LLP

(57) ABSTRACT

It is required to provide a method for classifying a set of data to be examined without a detailed analysis of the content of the set of data to be examined. A data classification system which solves the problem, the data classification system comprising: a data acquiring unit configured to acquire the plurality of data components of the data to be examined; an evaluation component extracting unit configured to extract a plurality of predetermined evaluation components from among the plurality of data components; a score value calculating unit configured to calculate score values for all of the plurality of known types based on the extracted plurality of evaluation components; and a classification determining unit configured to determine that the data to be examined belongs to a type with the highest value among the score values calculated by the score value calculating unit for all of the plurality of known types.

7 Claims, 4 Drawing Sheets

(56) References Cited

U.S. PATENT DOCUMENTS

| | | | | |
|---|---|---|---|---|
| 2012/0328594 A1* | 12/2012 | McKenna | G01N 33/66 | 424/94.4 |
| 2013/0259332 A1* | 10/2013 | McVey | G06T 7/0012 | 382/128 |
| 2014/0280174 A1* | 9/2014 | Bitan | G06F 17/30994 | 707/740 |
| 2015/0148604 A1* | 5/2015 | Gazdzinski | A61B 1/00016 | 600/109 |
| 2015/0299808 A1* | 10/2015 | Gonzalez Diaz | C12Q 1/6886 | 514/789 |
| 2016/0034305 A1* | 2/2016 | Shear | G06F 16/245 | 707/722 |

FOREIGN PATENT DOCUMENTS

| | | |
|---|---|---|
| JP | 200399445 A | 8/2015 |
| JP | 5801611 B2 | 10/2015 |
| WO | WO2011036830 A1 | 3/2011 |

* cited by examiner

[FIG. 1]
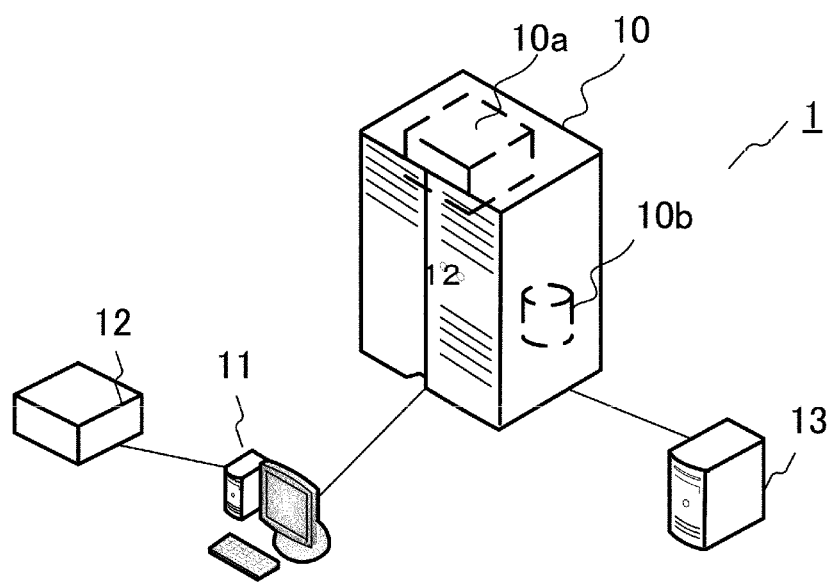

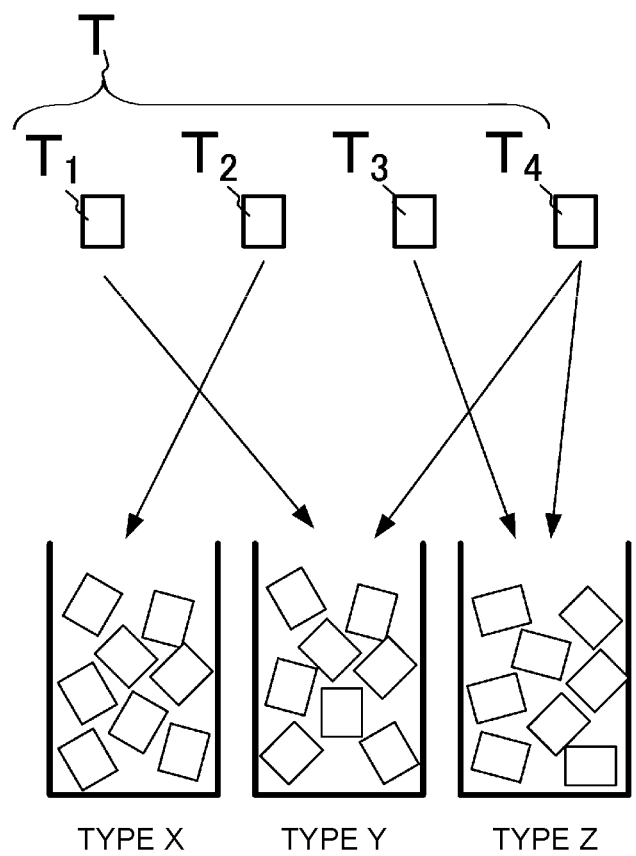

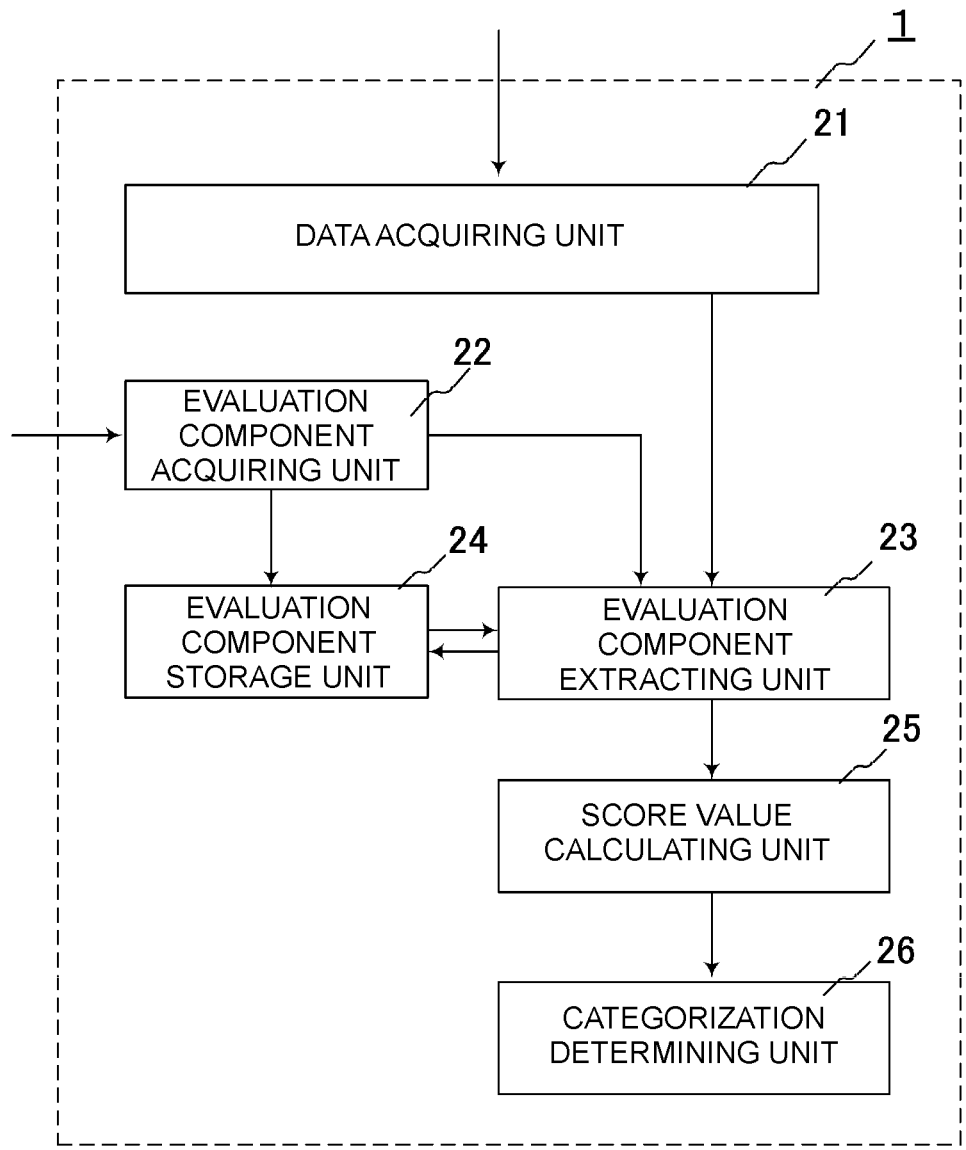
[FIG. 3]

[FIG. 4]
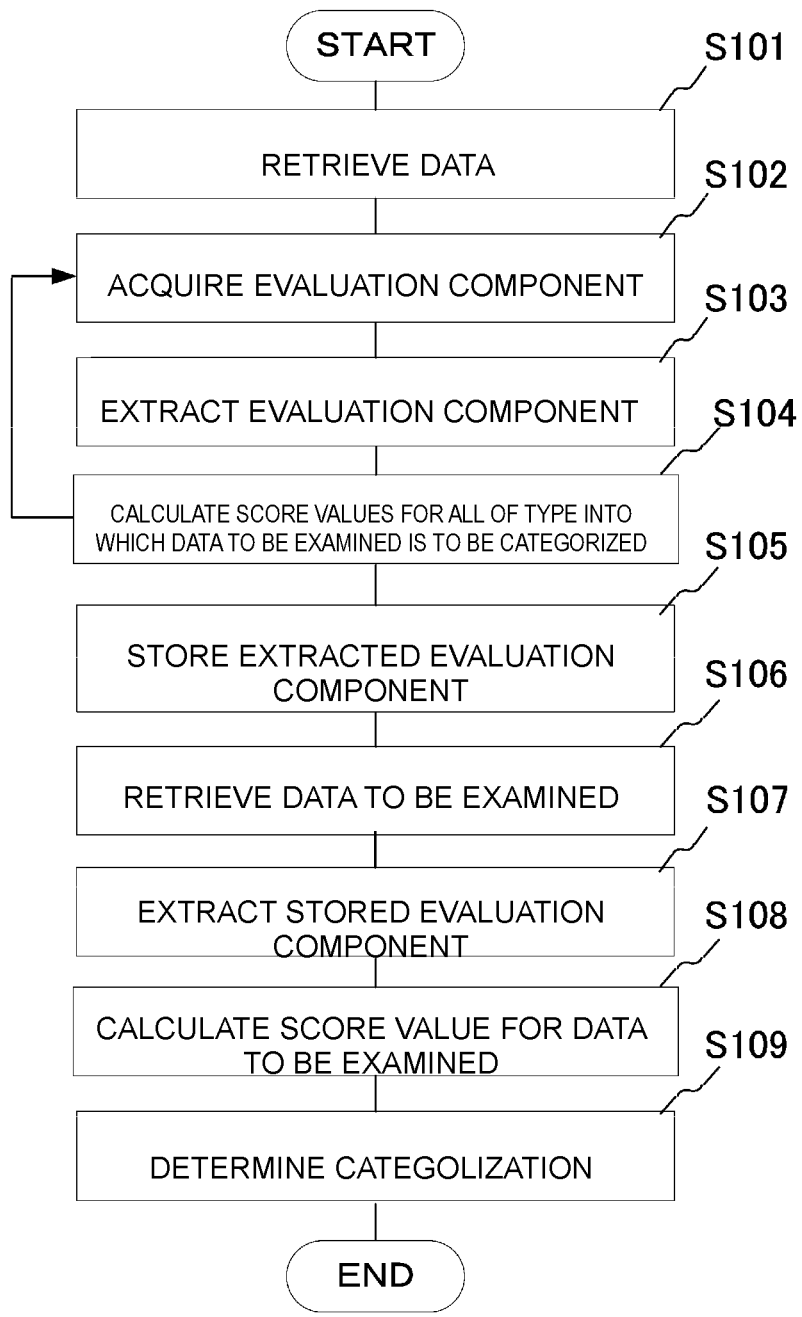

DATA CATEGORIZING SYSTEM, METHOD, PROGRAM SOFTWARE AND RECORDING MEDIUM THEREIN

BACKGROUND OF THE INVENTION

Field of the Invention

The present invention relates to a data categorizing system, a method, and program software for the method and a recording medium storing the program software.

Description of the Related Art

Data including data components has its own characteristics according to data contents of the data. In the case of a set including a number of data components of the data, it is necessary to categorize a plurality of pieces of data into a plurality of predetermined type groups without precise comparison of the content of the data in the set in some cases.

For example, Japanese Patent No. 5801611 discloses an apparatus which determines identity of an item name by calculating an item score from relevance to a word characterizing the content of the item with reference to an item notation score database.

SUMMARY OF THE INVENTION

With the method disclosed in Japanese Patent No. 5801611, the identity of an item name which is a word is determined by calculating an item score from the score database. However, data to be categorized is not limited to character data as disclosed in Japanese Patent No. 5801611 and can be data including various morphemes such as document data, image data and audio data. Therefore, it is desired to provide a method for categorizing these data by determining a difference in levels of relevance by a simple method.

The problem is solved by a data categorizing system which determines a type to which data to be examined belongs from among a plurality of known types, the data to be examined including a plurality of data components, the data categorizing system including a data acquiring unit configured to acquire the plurality of data components of the data to be examined, an evaluation component extracting unit configured to extract a plurality of predetermined evaluation components from among the plurality of data components, a score value calculating unit configured to calculate score values for all of the plurality of known types based on the extracted plurality of evaluation components, and a categorization determining unit configured to determine that the data to be examined belongs to a type with the highest value among the score values calculated by the score value calculating unit for all of the plurality of known types.

The problem is solved by a data categorizing method for determining a type to which data to be examined belongs from among a plurality of known types by a data categorizing system including a computer, the data to be examined including a plurality of data components, the data categorizing method including acquiring the plurality of data components of the data to be examined, extracting a plurality of predetermined evaluation components from among the plurality of data components, calculating score values for all of the plurality of known types based on the plurality of evaluation components, and determining that the data to be examined belongs to a type with the highest value among the score values calculated for all of the plurality of known types.

The problem is solved by data categorizing program software executable in a data categorizing system including a computer, the data categorizing system determining a type to which data to be examined belongs from among a plurality of known types, the data to be examined including a plurality of data components, the program software executing a step of acquiring the plurality of data components of the data to be examined, a step of extracting a plurality of predetermined evaluation components from among the plurality of data components, a step of calculating score values for all of the plurality of known types based on the plurality of evaluation components, and a step of determining that the data to be examined belongs to a type with the highest value among the score values calculated for all of the plurality of known types.

The problem is solved by a recording medium which stores data categorizing program software executable in a data categorizing system including a computer, the data categorizing system determining a type to which data to be examined belongs from among a plurality of known types, the data to be examined including a plurality of data components, the program software executing a step of acquiring the plurality of data components of the data to be examined, a step of extracting a plurality of predetermined evaluation components from among the plurality of data components, a step of calculating score values for all of the plurality of known types based on the plurality of evaluation components, and a step of determining that the data to be examined belongs to a type with the highest value among the score values calculated for all of the plurality of known types.

According to the present invention, it is possible to categorize data to be examined.

Further features of the present invention will become apparent from the following description of exemplary embodiments with reference to the attached drawings.

BRIEF DESCRIPTION OF THE DRAWINGS

FIG. 1 is a diagram of a hardware configuration of a data categorizing system 1 of the present invention;

FIG. 2 is a diagram illustrating principle of categorization in the data categorizing system of the present invention;

FIG. 3 is a functional block diagram of the data categorizing system of the present invention; and FIG. 4 is a diagram illustrating algorithm of a program of the data categorizing system of the present invention.

DESCRIPTION OF THE EMBODIMENTS

Preferred embodiments of the present invention will now be described in detail in accordance with the accompanying drawings.

[Hardware Configuration of Data Categorizing System]

A data categorizing system according to an embodiment of the present invention (hereinafter, simply referred to as a "system") will be described with reference to FIG. 1. FIG. 1 illustrates an exemplary hardware configuration of the system 1. The system 1 includes a server apparatus 10 and a client terminal 11. The server apparatus 10 includes an arithmetic device 10a which performs calculation and a storage device 10b for data storage.

The server apparatus 10 can execute main processing of data analysis. The client terminal 11 can execute related processing of the data analysis in the server apparatus 10. The storage device 10b can be, for example, any recording medium (such as a memory and a hard disc) which can store data (including digital data and analog data). The arithmetic device 10a is a controller (for example, central processing unit (CPU)) which can execute a control program stored in the recording medium. The arithmetic device 10a is a computer or a computer system (a system which executes data analysis by a plurality of computers integrally performing operation) which analyzes data at least temporarily stored in the recording medium. It should be noted that the arithmetic device 10a may be a management computer (not illustrated) in a form of an external device of the server apparatus 10, and the storage device 10b may be a data storage server device 13 in a form of an external storage device of the server apparatus 10.

The management computer (not illustrated) may include, for example, a memory, a controller, a bus, an input/output interface and a communication interface. It should be noted that memories in the client terminal 11, the server apparatus 10 and the management computer (not illustrated) store application programs which can control the client terminal 11, the server apparatus 10, and the management computer (not illustrated). These controllers execute the respective application programs so that the respective devices operate under the cooperation of the application programs (software resources) with hardware resources.

The storage device 10b includes, for example, a disk array system, and can be provided with a database which records data and a result of evaluation/categorization for the data. The server apparatus 10 is connected to the storage device 10b through a direct attached storage (DAS) or a storage area network (SAN).

The client terminal 11 presents data under processing in the server apparatus 10 to a user. Thus, the user can perform input through interaction via the client terminal 11, that is, can provide categorization information. The client terminal 11 may include, for example, a memory, a controller, a bus, an input/output interface (such as a keyboard and a display) and a communication interface (which connects the client terminal 11 and the server apparatus 10 so as to be able to communicate with each other through communication means using a predetermined network). The client terminal 11 may include an input device 12 such as a scanner.

It should be noted that the hardware configuration illustrated in FIG. 1 is merely an example, and the system 1 can be also implemented with other hardware configurations. For example, part or all of the processing may be executed at the server apparatus 10, or part or all of the processing may be executed at the client terminal 11. While, in the present embodiment, the input device 12 can perform transmission to the server apparatus 10 by being connected to the client terminal 11, the input device 12 may be directly connected to the server apparatus 10 so that input to the server can be performed from the input device 12. It can be understood by a person skilled in the art that there are various hardware configurations which can implement the system 1, and, for example, the hardware configuration is not limited to the configuration illustrated in FIG. 1.

[Principle of Categorization in Data Categorizing System]

The present invention determines a type group to which data to be examined T belongs from among a plurality of known type groups. The data to be examined T includes a plurality of data components. Principle of categorization in the data categorizing system in the present invention will be described below with reference to FIG. 2. FIG. 2 is a diagram illustrating the principle of the categorization in the data categorizing system. The number of types into which data to be examined is to be categorized may be two or more, and in the present embodiment, an example will be described where data to be examined T1, T2, T3 and T4 are categorized into three type groups of Type X, Type Y and Type Z. Learning process which is preparation for categorization will now be described. First, known data each of which apparently belongs to any of types into which data to be examined is desired to be categorized is prepared. The known data is prepared such that a plurality of pieces of the data belong to each type. That is, known data which is known in advance to apparently belong to each of Type X, Type Y and Type Z is prepared in advance. In this stage, the known data is preferably data which belongs to only one type and does not belong to other categorizing types. That is, data which apparently belongs to Type X and does not belong to Type Y and Type Z is prepared.

In the known data which apparently belongs to any of a plurality of types into which data to be examined is to be categorized, a plurality of evaluation components are selected which make clear the type to which the known data belongs from among a plurality of data components of the known data. That is, the evaluation components are included in the data components and prominently represent a type to which the data belongs among the data components. An index which is an evaluation value calculated by selecting the evaluation components, is made higher based on the number of appearance, combination and an appearance ratio of the evaluation components and categorization information set as a level contributing to combination of the appearance. A preferable form of this index is a score value (score). That is, the data components adopted as the evaluation components from the data components of the known data are selected so that the score value (score) is high in a type to which the known data belongs in all the known data belonging to the type.

That is, the score value (score) is an index for each of the known data, which quantitatively evaluates the strength of relevance between the known data and the data to be examined T based on the data components of each of the known data. Any calculation method of a score value (score) can be employed as long as the score value (score) can quantitatively represent the strength of relevance between the data components of the known data and the data to be examined T. A general method can be employed as the calculation method of a score value as long as the content of the known data can be appropriately evaluated. As an example, the score value (score) can be expressed as the following equation as the frequency of appearance of evaluation components in the data to be examined T with respect to an evaluation value of the evaluation component defined for each of the evaluation components extracted from the known data.

$$\text{Score} = \sum_{i=0}^{N} i \cdot (m_i \cdot wgt_i^2) \Big/ \sum_{i=0}^{N} i \cdot wgt_i^2$$

$m_i$: frequency of appearance of i-th evaluation component
$wgt_i$: evaluation value of i-th evaluation component Calculation of the score value is performed for all the types (Type X, Type Y and Type Z). Further, the evaluation components to be selected are set so that score values of other types are not high. The evaluation components selected for all the types are selected as evaluation components of the respective types and stored as a database for all the types. That is, a plurality of pieces of known data respectively belong to a plurality of known types into which data to be examined is to be categorized in advance, and the plurality of predetermined evaluation components are set in advance for all of the plurality of known types so that a score value of the type to which the known data belongs is higher than a score value of a type to which the known data does not belong. The learning process has been described above.

Now, categorization process will be described. Score values for the respective types are calculated for each of data to be examined T1, T2, T3 and T4, the type which belongs to is unclear, using all the types of evaluation components. For example, score values based on the evaluation components of the respective types are calculated for each of the data to be examined T1, T2, T3 and T4 for each of Type X, Type Y and Type Z. Because the evaluation components of the respective types are selected in advance for data which apparently belongs to the evaluation components of the respective types, the score values can be relatively higher in any of Type X, Type Y and Type Z. For example, the score value of type Y is higher than the score values of type X and type Z in the data to be examined T1 and T4, the score value of type X is higher in the data to be examined T2, and the score value of type Z is higher in the data to be examined T3. Thus, it can be considered that the data to be examined T1 belongs to type Y, the data to be examined T2 belongs to type X and the data to be examined T3 belongs to type Z, so that it is possible to categorize the data into the respective types.

According to the content of the type into which data to be examined is desired to be categorized, a large difference in score value distribution occurs with respect to a difference in type in some cases, while a small difference in score value distribution occurs in other cases. For example, in the case where type X, type Y and type Z are exclusive from one another, categorization is easy because there is a large difference in the score value distribution for each type. However, in the case where the type into which data to be examined is desired to be categorized has contents in common, a difference in the score value distribution for each type is small. Therefore, in the learning process, for each of the data belonging to each type, the score value distribution is analyzed in advance, and a range in which a clear difference in score values occurs between types (a difference between the highest value and the second highest value) is recognized by a magnification set within a predetermined range. For example, the magnification of a predetermined range can be set as predetermined times of standard deviation. If the score value falls within the magnification of the predetermined range, it can be determined that the data belongs to that type. On the other hand, if there is no large difference in the score values, the data can be categorized while it is determined that there is a possibility that the data belongs to a plurality of types with relatively high score values. For example, given that the data to be examined T4 has high score values for type Y and type Z, it is determined that the data to be examined T4 can be categorized into type Y and type Z.

[Functional Block Configuration of Data Categorizing System]

Functional blocks of the data categorizing system will be described below based on the principle of categorization with reference to FIG. 3. FIG. 3 is a diagram illustrating an example of the functional block configuration of the system 1. The system 1 includes, for example, a data acquiring unit 21, an evaluation component acquiring unit 22, an evaluation component extracting unit 23, an evaluation component storage unit 24, a score value calculating unit 25 and a categorization determining unit 26.

First, flow of the functional blocks in the learning process will be described. The data acquiring unit 21 acquires all the data components of all of a plurality of pieces of data known in advance to apparently belong to any of the known types into which data to be examined is to be categorized on a data-to-data basis. The data acquiring unit 21 acquires data components of the data, that is, all the data components of the data input from the input device 12 or the client terminal 11 or all the data components of the data already stored in the storage device 10b. Subsequently, the evaluation component acquiring unit 22 acquires evaluation components which are data prominently representing respective characteristics of a plurality of known types into which data to be examined is to be categorized among the data components of the data. The data components acquired by the data acquiring unit 21 and the evaluation component acquiring unit 22 are output to the evaluation component extracting unit 23.

The evaluation component extracting unit 23 confirms whether there are evaluation components acquired in advance at the evaluation component acquiring unit 22 and extracts the evaluation components from all the data components of the data acquired by the data acquiring unit 21 and outputs the evaluation components to the score value calculating unit 25. Definition of the score value is as described above. The score value calculating unit 25 calculates score values for all the plurality of known types based on the extracted evaluation components. When, in the score values calculated at the score value calculating unit 25, a score value of the type into which data to be examined is to be categorized is high as predicted, the evaluation components are output to the evaluation component storage unit 24. The evaluation component storage unit 24 stores a plurality of components selected in all the types in the storage device 10b or the data storage server device 13 as a database. That is, known data respectively belongs to the plurality of known types in advance, and the plurality of predetermined evaluation components are set in advance and stored so that the score value of the type to which the known data belongs is higher than score value of the type to which the known data does not belong.

Subsequently, flow of functional blocks in categorization process will be described. The data acquiring unit 21 acquires data components of any data to be examined T which is desired to be categorized and outputs the data components to the evaluation component extracting unit 23. The evaluation component extracting unit 23 extracts data components which match evaluation components of the respective types stored in the storage device 10b in the learning process by the evaluation component storage unit 24 among the acquired data components of the data to be examined T while associating the data components with the evaluation components and outputs the data components to the score value calculating unit 25. The score value calculating unit 25 calculates score values for each type into which data to be examined is to be categorized for the data and outputs the score values to the categorization determining unit 26. The categorization determining unit 26 compares the output score values for each type. For example, in the present embodiment, score values are calculated for type X, type Y and type Z. The categorization determining unit 26 compares these score values and determines that the data belongs to a type with the highest value. The categorization determining unit 26 may determine that the data belongs to a type with the highest value after determining the type with the highest value and in the case where a difference in the score values between the types (a difference between the highest value and the second highest value) exceeds a magnification of a predetermined range. At this time, the magnification of the predetermined range can be set as predetermined times of standard deviation. Further, the categorization determining unit 26 can determine that there is a possibility that the data is categorized into a plurality of types with high values in the case where there are a plurality of types for which the score values are high.

Further, the score value calculating unit 25 can normalize the score values calculated for all the plurality of known types using Z-score values. The categorization determining unit 26 can determine that the data to be examined T belongs to a type with the highest value among the calculated Z-score values. Here, the Z-score value (ZS) is an index for quantitatively evaluating the strength of relevance between the known data and the data to be examined T based on the data components of the known data for each of the known data. Any calculation method of the Z-score value (ZS) can be employed as long as the strength of relevance between the data components of the known data and the data to be examined T can be quantitatively expressed. A general method can be employed as the calculation method of the Z-score value (ZS) as long as the content of the known data can be appropriately evaluated. For example, as an example, the Z-score value (ZS) can be expressed as the following equation as the frequency of appearance of evaluation components in the data to be examined T with respect to an evaluation value of the evaluation component defined for each evaluation component extracted from the known data.

$$ZS=[Score-mean(Score_i)]/SE$$

Score: score value calculated with respect to certain data to be examined mean($Score_i$): average value of score values calculated for all known data in type to be categorized into SE: standard error or standard deviation of score values calculated for all known data in type to be categorized into It should be noted that, in the above description, because the configuration expressed using "unit" is a functional configuration implemented by the controller of the system 1 executing a program, the "unit" can be referred to as "processing" or "function". Further, because the "unit" can be replaced with a hardware resource, it can be understood by a person skilled in the art that these functional blocks can be implemented in various forms by only hardware, only software or combination of these, and the configuration is not limited to any of these.

[Algorithm Configuration of Program Executed in Component Relevance Evaluation System]

Subsequently, algorithm of a program executed in the system 1 for the above-described functions will be described. The system 1 can be executed by a program, and the program can be stored in a recording medium. First, algorithm of the learning process will be described. Data R a type to which belongs is known in advance is retrieved (S101). Components for categorizing the data R are acquired (S102). Evaluation components for the data R are extracted based on the acquired evaluation components (S103). Score values are calculated for each of all data which apparently belongs to any of types into which data to be examined is to be categorized based on the extracted evaluation components (S104). When there is no large difference between a score value for the type to which the data belongs and score values for other types, the process returns again to the acquisition of components for categorizing the data R (S102), and the process is repeated. In the case where there is an appropriate difference between the score value for the type to which the data belongs and the score values for other types, because the acquired evaluation components are appropriate, the acquired evaluation components are stored as evaluation components (S105).

Subsequently, algorithm of categorization process will be described. Data to be examined T which is desired to be categorized is retrieved (S106). The stored evaluation components are extracted from the data to be examined T (S107). Score values for the extracted data to be examined T are calculated based on the extracted evaluation components (S108). A type with the highest score value is determined, and a categorization indicating that the data to be examined belongs to the type is determined (S109). Here, as described above, it may be determined that the data belongs to the type with the highest value after the type with the highest value is determined and when a difference in score values between the types (a difference between the highest value and the second highest value) exceeds the magnification of the predetermined range. At this time, the magnification of the predetermined range can be set as predetermined times of standard deviation or standard error. Further, in the case where there are a plurality of types with high score values, it can be determined that there is a possibility that the data may be categorized into the plurality of types with high values.

[Implementation Example Using Software/Hardware]

Control blocks of the data analyzing system may be implemented using logic circuits (hardware) formed on an integrated circuit (IC chip), or may be implemented using software using a CPU. In the latter case, the above-described system includes a CPU which executes a program (a control program of the data analyzing system) which is software implementing each function, a ROM (Read Only Memory) or a storage device (referred to as a "recording medium") in which the program and various kinds of data are recorded in a readable manner by a computer (or the CPU), a RAM (Random Access Memory) which develops the program, or the like. By the computer (or the CPU) reading the above-described program from the above-described recording medium and executing the program, an object of the present invention is achieved. As the above-described recording medium, a "non-temporary tangible medium", for example, a tape, a disc, a card, a semiconductor memory, a programmable logic circuit, or the like, can be used. Further, the above-described program may be supplied to the above-described computer via any transmission medium (such as a communication network and a broadcast wave) which can transmit the program.

The present invention can be implemented in a form of a data signal, in which the above-described program is implemented through electronic transmission, and which is embedded in a carrier wave. It should be noted that the above-described program can be implemented using any programming language. Further, any recording medium in which the above-described program is recorded is incorporated into the scope of the present invention.

OTHER APPLICATION EXAMPLES

The above-described system can be implemented as an artificial intelligence system (any system which can evaluate relevance between data and a predetermined case) which analyzes big data, such as a discovery support system, a forensic system, an e-mail monitoring system, a medical application system (such as a pharma-covigilance support system, a system for clinical trial efficiency, a medical risk hedge system, a fall predicting (fall preventing) system, a prognosis predicting system, and a diagnosis support system), an Internet application system (such as a smart mail system, an information aggregation (curation) system, a user monitoring system, and a social media operating system), an information divulging detecting system, a project evaluating system, a marketing support system, an intellectual property evaluating system, an unauthorized trading monitoring system, a call center escalation system, and a credit checking system. It should be noted that, according to a field to which the data analyzing system of the present invention is applied, it is also possible to, for example, perform pre-processing on data (for example, extract important part from the data, use only the important part as a target for data analysis), or change an aspect where a result of the data analysis is displayed by taking into account specific circumstances of the field. A person skilled in the art would understand that there are various such modified examples, and all the modified examples are incorporated into the scope of the present invention.

The present invention is not limited to the above-described embodiments, and can be modified in various manners within the scope of the claims, and embodiments obtained by combining technical means disclosed in different embodiments as appropriate are included within the technical scope of the present invention. Further, by combining technical means disclosed in the respective embodiments, new technical characteristics can be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214407, filed Oct. 30, 2015, which is hereby incorporated by reference herein in its entirety.

What is claimed is:

1. A data categorizing system which determines a type to which a set of data to be examined belongs to either one among known types, the set of data to be examined including data components, the data categorizing system comprising:
a processor;
a data acquiring unit configured to acquire data components included in a set of data;
an evaluation component extracting unit configured to extract evaluation components among the data components;
a score value calculating unit configured to calculate score values for each of the known types based on the evaluation components extracted by the evaluation component extracting unit;
an evaluation component storage unit configured to store learning evaluation components determined in advance from sets of known data, each of which belongs to either one among the known types and includes data components, each of the sets of the known data selected to have a higher score value for one of the known types than score values of other of the known types among score values calculated by the score value calculating unit the learning evaluation components respectively representing an attribution in which a set of the known data belongs to the one of the known types,
wherein the evaluation component extracting unit is configured to extract evaluation components for a set of data to be examined, the evaluation components for the set of data to be examined being the same as one of the learning evaluation components determined and stored in the evaluation component storage unit in advance, from the data components of the set of data to be examined;
wherein the score value calculating unit calculates score values of the set of data for all of the known types based on the evaluation components for the set of data to be examined that is extracted by the evaluation component extracting unit; and
a categorization determining unit configured to determine that the set of data to be examined belongs to a type with the highest value among the score values calculated by the score value calculating unit for all of the known types.

2. The data categorizing system according to claim 1, wherein:
corresponding sets of known data belongs to each of the plurality of known types in advance, and
the evaluation components are set in advance so that, for all of the known types, a score value of a type to which the known data belongs is higher than a score value of a type to which the known data does not belong.

3. The data categorizing system according to claim 2, wherein:
the score value calculating unit normalizes the score values for all of the known types using Z-score values, and
the categorization determining unit determines that the set of data to be examined belongs to a type with the highest value among the Z-score values.

4. The data categorizing system according to claim 3, wherein the categorization determining unit determines that the set of data to be examined belongs to a type with the highest value in the case where a difference between the highest value and the second highest value falls within a predetermined range.

5. A data categorizing method for determining a type to which a set of data to be examined belongs to either one among known types by a data categorizing system including a computer, the set of data to be examined including data components, the data categorizing method comprising:
performing a learning process to determine learning evaluation components determined in advance from sets of known data, each of which belongs to either one among the known types and includes data components, each of the sets of known data selected to have a higher score value for one of the known types than score values of others of the known types among calculated score values, the learning evaluation components respectively representing an attribution in which a set of the known data belongs to the one of the known types;
acquiring data components in the set of data to be examined;
extracting evaluation components for a set of data to be examined, which are same as one of the learning evaluation components determined in advance, from the data components of the set of data to be examined;
calculating score values of the set of data for all of the known types based on the evaluation components for the set of data to be examined; and
determining that the set of data to be examined belongs to a type with the highest value among the score values calculated for all of the known types.

6. A data categorizing program software executable in a data categorizing system including a computer, the data categorizing system determining a type to which a set of data to be examined belongs to either one among known types, the set of data to be examined including data components, the program software executing:
- a step of performing a learning process to determine learning evaluation components determined in advance from sets of known data each of which belongs to either one among the known types and includes data components, each of the sets of known data selected to have a higher score value for one of the known types than score values of others of the known types among calculated score values, the learning evaluation components respectively representing an attribution in which a set of the known data belongs to the one of the known types;
- a step of acquiring data components in the set of data to be examined;
- a step of extracting evaluation components for a set of data to be examined, which are same as one of the learning evaluation components determined in advance, from the data components of the set of data to be examined;
- a step of calculating score values of the set of data for all of the known types based on the known data evaluation components; and
- a step of determining that the set of data to be examined belongs to a type with the highest value among the score values calculated for all of the known types.

7. A non-transitory recording medium which stores data categorizing program software executable in a data categorizing system including a computer, the data categorizing system determining a type to which a set of data to be examined belongs to either one among known types, the set of data to be examined including data components, the program software executing:
- a step of performing a learning process to determine learning evaluation components determined in advance from sets of known data each of which belongs to either one among the known types and includes data components, each of the sets of known data selected to have a higher score value for one of the known types than score values of others of the known types among calculated score values, the learning evaluation components respectively representing an attribution in which a set of the known data belongs to the one of the known types;
- a step of acquiring data components in the set of data to be examined;
- a step of extracting evaluation components for a set of data to be examined, which are same as one of the learning evaluation components determined in advance, from the data components of the set of data to be examined;
- a step of calculating score values of the set of data for all of the known types based on the known data evaluation components; and
- a step of determining that the set of data to be examined belongs to a type with the highest value among the score values calculated for all of the known types.

* * * * *